United States Patent
Tanaka et al.

(10) Patent No.: US 7,772,967 B2
(45) Date of Patent: Aug. 10, 2010

(54) CRIME PREVENTION DEVICE FOR VEHICLE

(75) Inventors: Masahiro Tanaka, Toyota (JP); Takeo Endo, Nagoya (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 220 days.

(21) Appl. No.: 11/815,043

(22) PCT Filed: Mar. 8, 2006

(86) PCT No.: PCT/JP2006/304512

§ 371 (c)(1),
(2), (4) Date: Jul. 30, 2007

(87) PCT Pub. No.: WO2006/098205

PCT Pub. Date: Sep. 21, 2006

(65) Prior Publication Data

US 2009/0051511 A1    Feb. 26, 2009

(30) Foreign Application Priority Data

Mar. 15, 2005 (JP) .............................. 2005-073151

(51) Int. Cl.
*B60R 25/10* (2006.01)
(52) U.S. Cl. ................................ 340/426.1; 340/426.24
(58) Field of Classification Search .............. 340/426.1, 340/426.18, 426.22, 426.24, 426.26
See application file for complete search history.

(56) References Cited

U.S. PATENT DOCUMENTS

| 7,190,253 B2 | 3/2007 | Shimomura |
| 7,391,301 B2 | 6/2008 | Seike et al. |
| 2003/0095040 A1* | 5/2003 | Shimomura ............ 340/426.13 |
| 2004/0263323 A1* | 12/2004 | Seike et al. ............. 340/426.1 |

FOREIGN PATENT DOCUMENTS

| DE | 102 53 915 A1 | 5/2003 |
| DE | 10 2004 017 835 A1 | 12/2004 |
| JP | 2002 53011 | 2/2002 |
| JP | 2003 36482 | 2/2003 |
| JP | 2003 167050 | 6/2003 |
| JP | 2003 335221 | 11/2003 |
| JP | 2005 1642 | 1/2005 |

* cited by examiner

*Primary Examiner*—Thomas J Mullen
(74) *Attorney, Agent, or Firm*—Oblon, Spivak, McClelland, Maier & Neustadt, L.L.P.

(57) ABSTRACT

A vehicle security system including an intrusion determining unit that transmits a transmission wave in a vehicle, and determines, based on an output of a reflected wave of the transmission wave, whether or not a body intrudes into the vehicle. The security system also includes an adjacent body detecting unit that detects a body adjacent to the vehicle. The intrusion determining unit determines that the body does not intrude into the vehicle, when the output of the reflected wave is within a predetermined range and the adjacent body detecting unit detects the body adjacent to the vehicle.

18 Claims, 4 Drawing Sheets

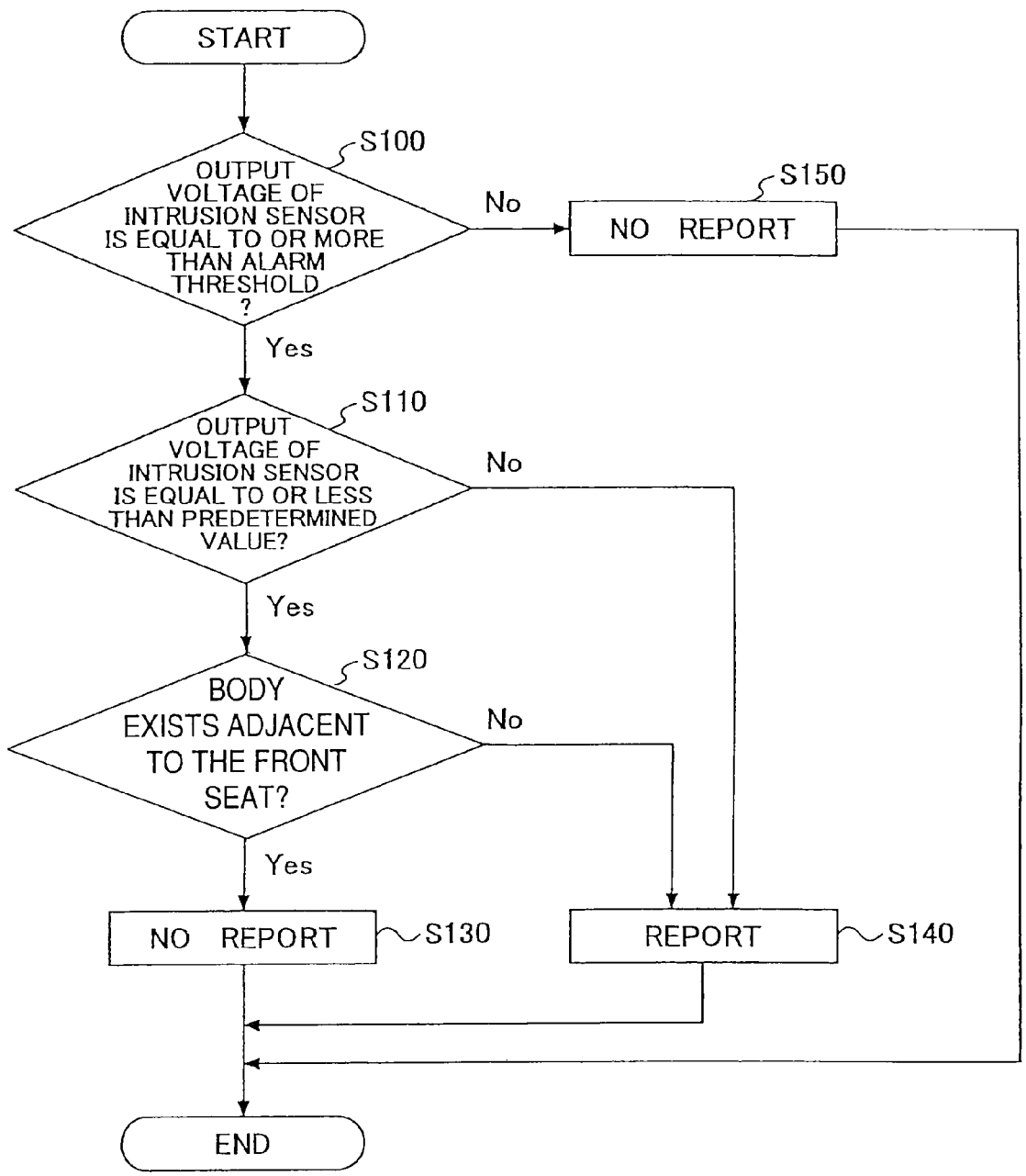

CRIME PREVENTION DEVICE FOR VEHICLE

TECHNICAL FIELD

The present invention relates to a vehicle security system in which reliability is improved.

BACKGROUND ART

In the prior art, a vehicle security system is known in which intrusion into a vehicle is detected with the use of an ultrasonic wave generated from a frontmost part of an approximately center of the vehicle room, and alarming is made (for example, see Patent Document 1).

Further, a vehicle intrusion detection system is known in which a reflected wave obtained from reflection of a transmission wave, which is transmitted in a vehicle, from a body in the vehicle is analyzed, and intrusion into the vehicle is detected (for example, see Patent Document 2).

Patent Document 1: Japanese Laid-Open Patent Application 2002-53011

Patent Document 2: Japanese Laid-Open Patent Application 2003-167050

SUMMARY OF THE INVENTION

In the vehicle security system and the vehicle intrusion detection system in the prior art mentioned above, there is a case where an intrusion sensor for detecting intrusion into the vehicle is provided on a vehicle front side, and a body intrudes into a vehicle rear seat. In this case, since a distance between the intrusion sensor and the body intruding into the vehicle rear seat is long, an output signal upon the intrusion detection is low. On one hand, when a body approaches the outside of the vehicle, adjacent the vehicle front seat, the output signal of the intrusion sensor may exceed a threshold for detecting intrusion, even though the body is outside of the vehicle, since a distance between the intrusion sensor and the body is short. The output signal in this case becomes close to the output signal in the case where the body intrudes into the rear seat of the vehicle. As a result, when the body approaches the outside of the vehicle, adjacent the vehicle front seat, an erroneous detection that the body has intruded into the vehicle may be made.

The present invention has been made to solve such a problem, and an object of the present invention is to improve reliability of the vehicle security system.

One aspect of the present invention to solve the problem is a vehicle security system including intrusion determining means for transmitting a transmission wave in a vehicle, and determining, based on an output of a reflected wave of the transmission wave, whether or not a body intrudes into the vehicle, and an adjacent body determining means for detecting a body adjacent to the vehicle, wherein the intrusion determining means determines that the body has not intruded into the vehicle, when the output of the reflected wave is within a predetermined range, and also, the adjacent body detecting means detects the body adjacent to the vehicle.

In this aspect, the above-mentioned matter that the output of the reflected wave is within the predetermined range means a range of, for example, equal to or less than the lowest value at which it is regarded that the body has intruded into the vehicle and also less than the highest value at which it is sure that the body had intruded into the vehicle. Further, as the above-mentioned case where the output of the reflected wave is within the predetermined range, for example there is a case where the body exists outside of the vehicle, adjacent to the vehicle, or, a case where the body exists apart from an intrusion sensor which detects intrusion, inside of the vehicle. The outputs of the reflected waves in both cases become close to one another. Further, the body has intruded into the vehicle means, for example, a fact that an intruder or such having a purpose of theft has intruded into the vehicle.

In this one aspect, the transmission wave and the reflected wave may be transmitted and received on a front side of the vehicle, and the adjacent body detecting means may detect the body outside of the vehicle, adjacent the front side. In this case, an output of the reflected wave may become within the above-mentioned predetermined range in each of a situation that the body has intruded into the rear part inside of the vehicle and a situation that the body exists outside of the vehicle, adjacent the front side. Therefore, when the adjacent body detecting means detects the body outside of the vehicle, adjacent to the vehicle front side, the intrusion determining means determines that the body has not intruded into the vehicle. That is, it is possible to prevent erroneous determination of the situation that the body exists outside of the vehicle, adjacent the front side, as the situation that the body has intruded into the rear part inside of the vehicle. Accordingly, it is possible to improve reliability of the vehicle security system.

In this one aspect, the transmission wave and the reflected wave may be transmitted and received on a rear side of the vehicle, and the adjacent body detecting means may detect the body outside of the vehicle, adjacent the rear side. In this case, an output of the reflected wave may become within the above-mentioned predetermined range in each of a situation that the body has intruded into the front part inside of the vehicle and a situation that the body exists outside of the vehicle, adjacent the rear side. Therefore, when the adjacent body detecting means detects the body outside of the vehicle, adjacent the vehicle rear side, the intrusion determining means determines that the body has not intruded into the vehicle. That is, it is possible to prevent erroneous determination of the situation that the body exists outside of the vehicle, adjacent the rear side of the vehicle as the situation that the body has intruded into the front part inside of the vehicle. Accordingly, it is possible to improve reliability of the vehicle security system.

Further, in this one aspect, reporting means for reporting to the outside when the intrusion determining means determines that a body has intruded into the vehicle may be provided. Thereby, it is possible to improve vehicle security.

By the present invention, it is possible to improve reliability of the vehicle security system.

BRIEF DESCRIPTION OF DRAWINGS

FIG. 4 is a flow chart of a control routine of the vehicle security system in the present embodiment, and is a drawing showing determining processing determining whether or not an intruder or such has intruded into a vehicle.

DESCRIPTION OF REFERENCE NUMERALS

1 VEHICLE SECURITY SYSTEM
3 INTRUSION SENSOR
5 ECU (INTRUSION DETERMINING MEANS)
7 REPORTING PART
9 ULTRASONIC SENSOR (ADJACENT BODY DETECTING MEANS)

DETAILED DESCRIPTION

Below, a best mode for carrying out the invention will be described with reference to figures attached hereto. It is noted that a basic concept, a main hardware configuration, an operation principle, and a basic control procedure of a vehicle security system are known to the person skilled in the art, and thus, detailed description thereof is omitted.

Figure 1:
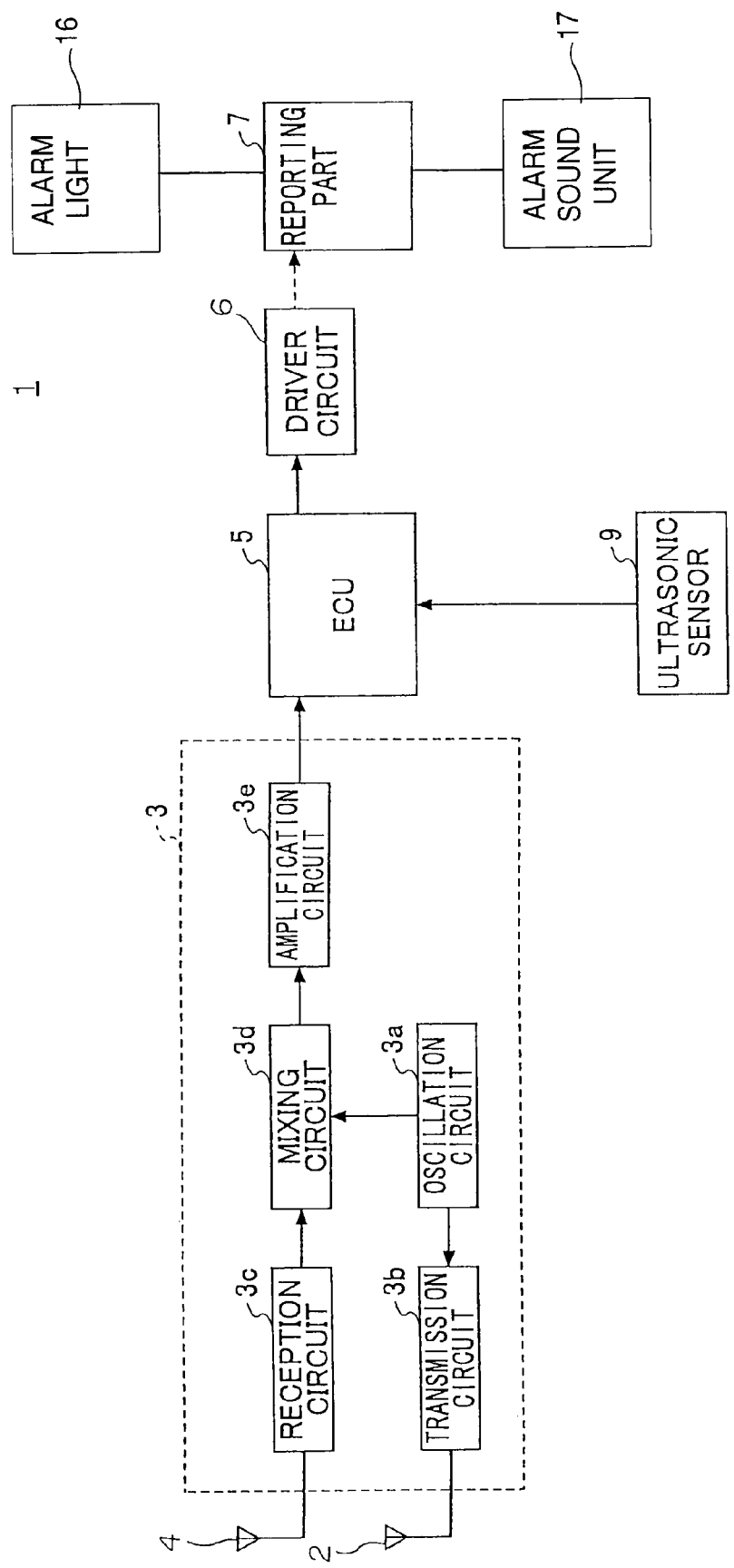
FIG. 1 is a general diagram of a system configuration of a vehicle security system in one embodiment of the present invention.

FIG. 1 shows a general diagram of a system configuration of a vehicle security system in one embodiment of the present invention. The vehicle security system 1 in the embodiment includes an oscillation circuit 3a oscillating an electromagnetic wave of 24 GHz for example, and a transmission circuit 3b, connected with the oscillation circuit 3a, for transmitting a transmission wave such as the electromagnetic wave oscillated by the oscillation circuit 3a or such, via an antenna. The transmission wave transmitted via the transmission antenna 2 becomes a reflected wave after being reflected by a body such as an intruder in a vehicle, and the reflected wave is then received by a reception circuit 3c via a reception antenna 4. The reception circuit 3c and the oscillation circuit 3a are connected with a mixing circuit 3d which generates a beat signal as a result of mixing the transmission wave and the reflected wave. Further, to the mixing circuit 3d, an amplification circuit 3e which amplifies the beat signal generated by the mixing circuit 3d is connected. An intrusion sensor 3 thus configured as described above is mounted on a ceiling of a frontmost part of an approximate center inside of the vehicle, at which a vehicle interior light, a map lamp or such is disposed for example.

Further, to the amplification circuit 3e, an ECU 5 is connected, which analyzes the beat signal amplified by the amplification circuit 3e, and determines whether or not an intruder has intruded into the vehicle. Specifically, the ECU 5 determines that an intruder or such has intruded into the vehicle when the beat signal (voltage) output from the amplification circuit 3e is equal to or more than a reporting threshold. It is noted that the ECU (Electronic Control Unit) 5 is configured by a microcomputer, and has a ROM storing a control/operation program, a readable and writable RAM storing an operation result or such, a counter, an input interface, and an output interface.

To the ECU 5, a reporting part 7 is connected via a driver circuit 6, and the ECU 5 transmits a reporting signal to the reporting part 7 when determining that a body has intruded into the vehicle. When receiving the reporting signal from the ECU 5, the reporting part 7 reports to a user, a person outside the vehicle or such with the use of an alarm sound unit 17 (for example, sounding a horn of the vehicle) or an alarm light 16 (for example, blinking lamps mounted in the vehicle such as headlights, room lamps or such). Thereby, the intruder in the vehicle is warned, and thus, security effect improves. It is noted that the reporting part 7 may automatically report to a contact address such as a telephone number, an electronic mail address, or such, previously stored, based on the reporting signal from the ECU 5.

Figure 2:
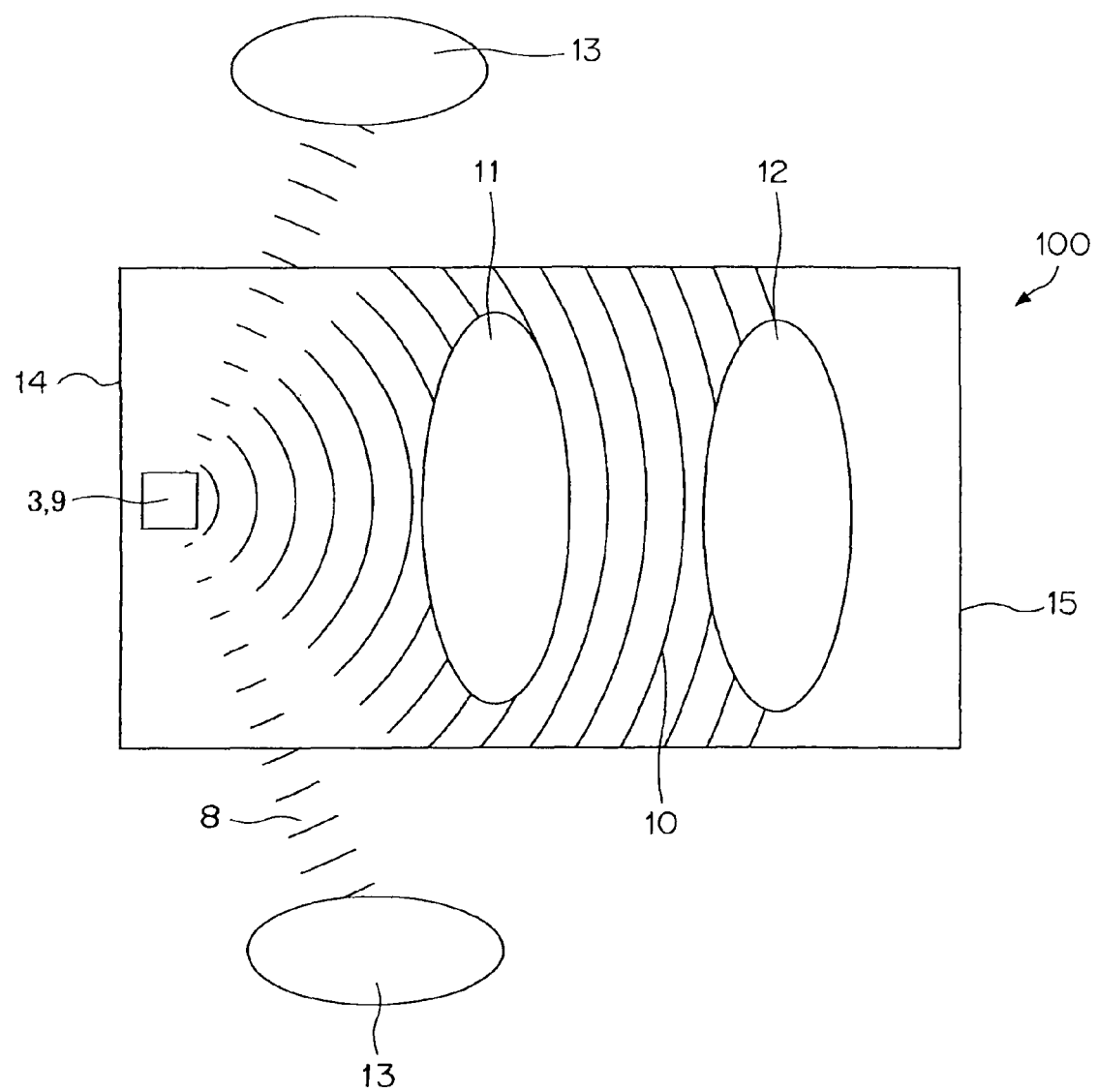
FIG. 2 is a drawing showing positions at which an intrusion sensor and an ultrasonic sensor are mounted.

As shown in FIG. 1, a distance detecting sensor 9 such as an ultrasonic sensor, for detecting a distance between the vehicle and a body, is connected to the ECU 5. FIG. 2 illustrates a vehicle 100 that includes a vehicle front side 14 and a vehicle rear side 15. The ultrasonic sensor 9 is disposed adjacent the intrusion sensor 3, transmits an ultrasonic wave 8 of approximately 40 kHz for example, approximately in a direction of a window of a front seat 11, receives a reflected wave thereof, and thereby, detects distance information to the body 13 (for example, a human being, an animal or such) outside of the vehicle, adjacent the front seat 11. Based on the distance information from the ultrasonic sensor 9, the ECU 5 calculates a distance between the vehicle and the body, and, based on the calculated distance between the vehicle and the body, it recognizes a position of the body with respect to the vehicle, such as whether the body exists inside or outside of the vehicle. Further, the ECU 5 determines whether or not the body exists outside of the vehicle, adjacent the vehicle front seat 11.

A principle of the ECU 5 determining whether or not an intruder or such has intruded into the vehicle will be described next.

The transmission circuit 3b of the intrusion sensor 3 transmits the transmission wave 10 in a direction to the rear side 15 of the vehicle via the transmission antenna 2, and a reflected wave thereof is received by the reception circuit 3c via the reception antenna 4. At this time, when an intruder intrudes into the vehicle, the transmission wave is reflected by the intruder who moves inside of the vehicle, and the reflected wave is amplified more than an ordinary condition (no moving body exists inside of the vehicle). By the thus-amplified reflected wave, the beat signal (the output voltage of the intrusion sensor 3) generated by the mixing circuit 3d increases. Then, when the beat signal becomes equal to or more than the reporting threshold, the ECU 5 determines that an intruder has intruded into the vehicle.

Figure 3:
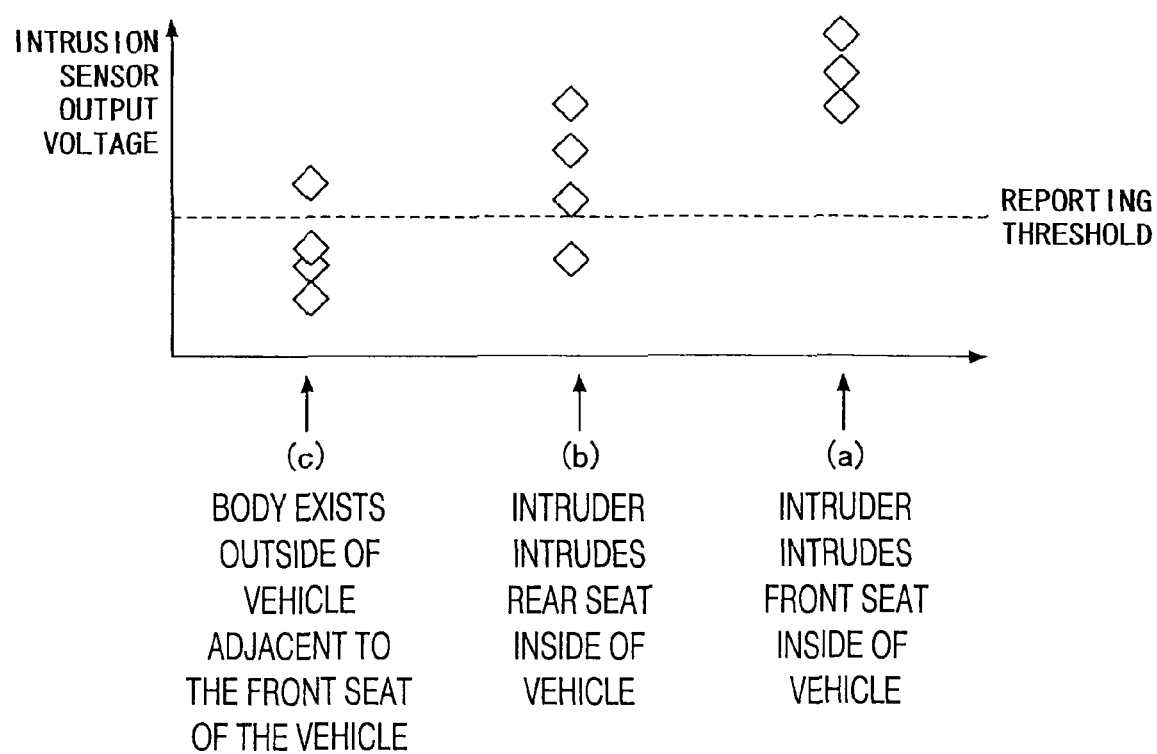
FIG. 3 is a drawing showing one example of a range of an output voltage output by the intrusion sensor (amplification circuit).

FIG. 3 shows one example of a range of the output voltage output from the intrusion sensor 3 (amplification circuit 3e).

As shown in FIGS. 2 and 3, when an intruder has intruded into the front seat 11 inside of the vehicle, the distance between the intrusion sensor 3 and the intruder is short. As a result, the output voltage of the intrusion sensor 3 becomes relatively large, and thus, exceeds the reporting threshold, as shown in (a). It is noted that when the distance between the intrusion sensor 3 and an intruder or such is short, attenuation in the transmission wave and the reflected wave is small, whereby, the output voltage of the intrusion sensor 3 becomes large. On the other hand, when an intruder intrudes into the rear seat 12 inside of the vehicle (b), the distance between the intrusion sensor 3 and the intruder is longer than the case where the intruder intrudes into the front seat 11 inside of the vehicle (a), whereby, the output voltage of the intrusion sensor 3 becomes relatively small. Further, when a body (human being) exists outside of the vehicle, adjacent the vehicle front seat 11, the output voltage of the intrusion sensor 3 becomes relatively small, but the maximum value thereof may exceed the reporting threshold, as shown in (c). When the body (human being) exists outside of the vehicle, adjacent the vehicle front seat 11, the output voltage (c) of the intrusion sensor 3 has a relatively small value. However, this value is relatively close to the output voltage (b) of the intrusion sensor 3 when the intruder intrudes into the rear seat 12 inside of the vehicle. Therefore, in a vehicle security system in the prior art, erroneous determination may be made such that the case where a body exists outside of the vehicle, adjacent the vehicle front seat 11 (c) is determined as the case where the body has intruded into the rear seat 12 inside of the vehicle (b).

Next, a method by which the ECU 5 of the vehicle security system 1 in the embodiment of the present invention avoids the above-mentioned erroneous determination and determines whether or not an intruder or such has intruded in the vehicle with high precision, will be described.

FIG. 4 is a flow chart of a control routine of the vehicle security system 1 in the embodiment, that illustrates a process of determining whether or not an intruder or such has intruded into the vehicle. The control routine shown in FIG. 4 is carried out repetitively every 64 ms, for example.

The ECU 5 determines whether or not the output voltage of the intrusion sensor 3 is equal to or more than the reporting threshold and an intruder or such has intruded into the vehicle (S100).

When determining that the output voltage of the intrusion sensor 3 is equal to or more than the reporting threshold, the ECU 5 provisionally determines that an intruder has intruded into the vehicle, and determines whether or not the output voltage of the intrusion sensor 3 is equal to or less than a predetermined value (S110). The predetermined value is set as an average of the output voltages of the intrusion sensor 3 obtained when a body exists on a front seat 11 inside of the vehicle. However, the predetermined value may be an arbitrary value as long as the value is such an output value of the intrusion sensor 3 that ensures a body has intruded into the front seat 11 inside of the vehicle. On the other hand, when determining that the output voltage of the intrusion sensor 3 is less than the reporting threshold, the ECU 5 determines that no intruder or such has intruded into the vehicle, and finishes the routine processing without transmitting the reporting signal to the reporting part 7 (S150).

When determining that the output voltage of the intrusion sensor 3 is equal to or less than the predetermined value, the ECU 5 determines whether or not a body exists outside of the vehicle, adjacent the vehicle front seat 11, based on the distance information from the ultrasonic sensor 9 (S120). On one hand, when determining that the output voltage of the intrusion sensor 3 is more than the predetermined value, the ECU 5 determines that an intruder has intruded into the front seat 11 inside of the vehicle, and transmits the reporting signal to the reporting part 7. When receiving the reporting signal from the ECU 5, the reporting part 7 reports to a user or such (S140), and finishes the routine processing.

From the above-mentioned determination (S120), it is possible to distinguish between the situation that a body exists outside of the vehicle, adjacent the vehicle front seat 11, and the situation that an intruder has intruded into the rear seat 12 inside of the vehicle. That is, in the above-mentioned (S100), when the output voltage of the intrusion sensor 3 is equal to or more than the reporting threshold, and also the output voltage is equal to or less than the predetermined value in (S110), it is difficult to determine whether the situation (c) that a body exists outside of the vehicle, adjacent the vehicle front seat 11 or the situation (b) that an intruder has intruded into the rear seat 12 inside of the vehicle has occurred. Therefore, based on the distance information from the ultrasonic sensor 9, the ECU 5 determines whether or not a body exists outside of the vehicle, adjacent the vehicle front seat 11. Thereby, it is possible to positively distinguish between the situation (c) that a body exists outside of the vehicle, adjacent the vehicle front seat 11 and the situation (b) that an intruder has intruded into the rear seat 12 inside of the vehicle.

When determining in (S120) that a body exists outside of the vehicle, adjacent the vehicle front seat 11, the ECU 5 changes the provisional determination in (S110) that an intruder has intruded into the vehicle, and determines that no intruder has intruded into the vehicle. As a result, the ECU 5 finishes the routine processing without transmitting the reporting signal to the reporting part 7 (S130). On one hand, when determining that no body exists outside of the vehicle, adjacent the vehicle front seat 11, the ECU 5 determines that an intruder has intruded into the rear seat 12 inside of the vehicle, and transmits the reporting signal to the reporting part 7. When receiving the reporting signal, the reporting part 7 reports to the user or such (S140) and finishes the routine processing.

Thus, when the output voltage of the intrusion sensor 3 is equal to or more than the reporting threshold and also the output voltage is equal to or less than the predetermined value in (S110), the ECU 5 determines whether or not a body exists outside of the vehicle, adjacent the vehicle front seat 11, based on the information from the ultrasonic sensor 9. Thereby, it is possible to avoid erroneous determination of the situation (c) that a body exists outside of the vehicle, adjacent the vehicle front seat 11, as the situation (b) that an intruder has intruded into the rear seat 12 inside of the vehicle. Accordingly, it is possible to improve reliability of the vehicle security system 1.

Thus, the embodiment for the best mode for carrying out the present invention has been described. However, the present invention should not be limited to the embodiment, and various changes and replacements may be made in the above-mentioned embodiment, within such a scope that it deviates from the subject matter of the present invention.

For example, in the above-mentioned embodiment, the intrusion sensor 3 and the ultrasonic sensor 9 are mounted on the ceiling of the frontmost part of the approximate center inside of the vehicle on which the vehicle interior lamp, the map lamp or such is mounted. However, the intrusion sensor 3 and the ultrasonic sensor 9 may be mounted on the ceiling of a rearmost part of the approximate center inside of the vehicle. In this case, the ultrasonic sensor 9 detects distance information for a body existing outside of the vehicle, adjacent to the rear seat 12.

When the output voltage of the intrusion sensor 3 is equal to or more than the reporting threshold, and also, the output voltage is equal to or less than the predetermined voltage, the ECU 5 determines, based on the distance information from the ultrasonic sensor 9, whether or not a body exists outside of the vehicle, adjacent to the vehicle rear seat 12. When determining that a body exists outside of the vehicle, adjacent to the vehicle rear seat 12, the ECU 5 determines that no intruder has intruded into the vehicle. Accordingly, the ECU 5 does not transmit the reporting signal to the reporting part 7. On the other hand, when determining that no body exists outside of the vehicle, adjacent the vehicle rear seat 12, the ECU 5 determines that an intruder has intruded into the front seat 11 inside of the vehicle, and transmits the reporting signal to the reporting part 7. Thereby, it is possible to avoid erroneous determination of the situation that a body exists outside of the vehicle, adjacent the vehicle rear seat 12, as the situation that an intruder has intruded into the front seat 11 inside of the vehicle.

The present invention can be applied to a vehicle security system. An external appearance, a weight, a size, a running performance and so forth of a vehicle, to which the vehicle security system is mounted, are immaterial.

The present application is based on Japanese Priority Application No. 2005-073151, filed on Mar. 15, 2005, the entire contents of which are hereby incorporated herein by reference.

The invention claimed is:

1. A vehicle security system comprising:
   intrusion determining means for transmitting a transmission wave in a vehicle and determining, based on an output of a reflected wave of the transmission wave, whether or not a body intrudes into the vehicle; and
   adjacent body detecting means for detecting a body adjacent to the vehicle,
   wherein said intrusion determining means determines that the body has intruded into the vehicle when the output of the reflected wave is within a predetermined range and the intrusion determining means determines that the body is not adjacent to the vehicle based on information provided by the adjacent body detecting means, and
   wherein said intrusion determining means determines that the body has not intruded into the vehicle, when the output of the reflected wave is within the predetermined range and the adjacent body detecting means detects the body adjacent to the vehicle.

2. The vehicle security system as claimed in claim 1,
   wherein the vehicle includes a front side and a rear side,
   wherein the transmission wave and the reflected wave are transmitted and received on the front side of the vehicle, and
   wherein the adjacent body detecting means detects the body outside of the vehicle adjacent to the front side.

3. The vehicle security system as claimed in claim 2,
   wherein the vehicle includes a front seat disposed inside the vehicle at the front side, and
   wherein the adjacent body detecting means detects the body outside of the vehicle adjacent to the front seat.

4. The vehicle security system as claimed in claim 1,
   wherein the vehicle includes a front side and a rear side,
   wherein the transmission wave and the reflected wave are transmitted and received on the rear side of the vehicle, and
   wherein the adjacent body detecting means detects the body outside of the vehicle adjacent to the rear side.

5. The vehicle security system as claimed in claim 4,
   wherein the vehicle includes a rear seat disposed inside the vehicle at the rear side, and
   wherein the adjacent body detecting means detects the body outside of the vehicle adjacent to the rear seat.

6. The vehicle security system as claimed in claim 1, further comprising:
   reporting means for reporting an intrusion when said intrusion determining means determines that the body intrudes into the vehicle.

7. The vehicle security system as claimed in claim 6, the intrusion is reported via an alarm light or an alarm sound unit.

8. The vehicle security system as claimed in claim 1,
   wherein the intrusion determining means includes an intrusion sensor such that the transmission wave is an electromagnetic wave transmitted by the intrusion sensor, and
   wherein the adjacent body detecting means includes a distance sensor that detects a distance between the body and the vehicle.

9. The vehicle security system as claimed in claim 1, wherein the output of the reflected wave is a voltage that is output by an intrusion sensor that correlates to an amplitude of the reflected wave.

10. A vehicle security system comprising:
    an intrusion determining unit that transmits a transmission wave in a vehicle and that determines based on an output of a reflected wave of the transmission wave, whether or not a body intrudes into the vehicle; and
    an adjacent body detecting unit that detects a body adjacent to the vehicle,
    wherein said intrusion determining unit determines that the body has intruded into the vehicle when the output of the reflected wave is within a predetermined range and the intrusion determining unit determines that the body is not adjacent to the vehicle based on information provided by the adjacent body detecting unit, and
    wherein said intrusion determining unit determines that the body has not intruded into the vehicle, when the output of the reflected wave is within the predetermined range and the adjacent body detecting unit detects the body adjacent to the vehicle.

11. The vehicle security system as claimed in claim 10,
    wherein the vehicle includes a front side and a rear side,
    wherein the transmission wave and the reflected wave are transmitted and received on the front side of the vehicle, and
    wherein the adjacent body detecting unit detects the body outside of the vehicle adjacent to the front side.

12. The vehicle security system as claimed in claim 11,
    wherein the vehicle includes a front seat disposed inside the vehicle at the front side, and
    wherein the adjacent body detecting unit detects the body outside of the vehicle adjacent to the front seat.

13. The vehicle security system as claimed in claim 10,
    wherein the vehicle includes a front side and a rear side,
    wherein the transmission wave and the reflected wave are transmitted and received on the rear side of the vehicle, and
    wherein the adjacent body detecting unit detects the body outside of the vehicle adjacent to the rear side.

14. The vehicle security system as claimed in claim 13,
    wherein the vehicle includes a rear seat disposed inside the vehicle at the rear side, and
    wherein the adjacent body detecting unit detects the body outside of the vehicle adjacent to the rear seat.

15. The vehicle security system as claimed in claim 10, further comprising:
    a reporting part that reports an intrusion when said intrusion determining unit determines that the body intrudes into the vehicle.

16. The vehicle security system as claimed in claim 15, the intrusion is reported via an alarm light or an alarm sound unit.

17. The vehicle security system as claimed in claim 10,
    wherein the intrusion determining unit includes an intrusion sensor such that the transmission wave is an electromagnetic wave transmitted by the intrusion sensor, and
    wherein the adjacent body detecting unit includes a distance sensor that detects a distance between the body and the vehicle.

18. The vehicle security system as claimed in claim 10, wherein the output of the reflected wave is a voltage that is output by an intrusion sensor that correlates to an amplitude of the reflected wave.

* * * * *